May 24, 1932.

G. H. POWERS 1,859,791

COMMUNICATION CARTRIDGE FOR UNDERSEA VESSELS

Filed Sept. 22, 1930   2 Sheets-Sheet 1

Fig. 1.

G. H. Powers, INVENTOR

BY Victor J. Evans

ATTORNEY

May 24, 1932.  G. H. POWERS  1,859,791
COMMUNICATION CARTRIDGE FOR UNDERSEA VESSELS
Filed Sept. 22, 1930  2 Sheets-Sheet 2
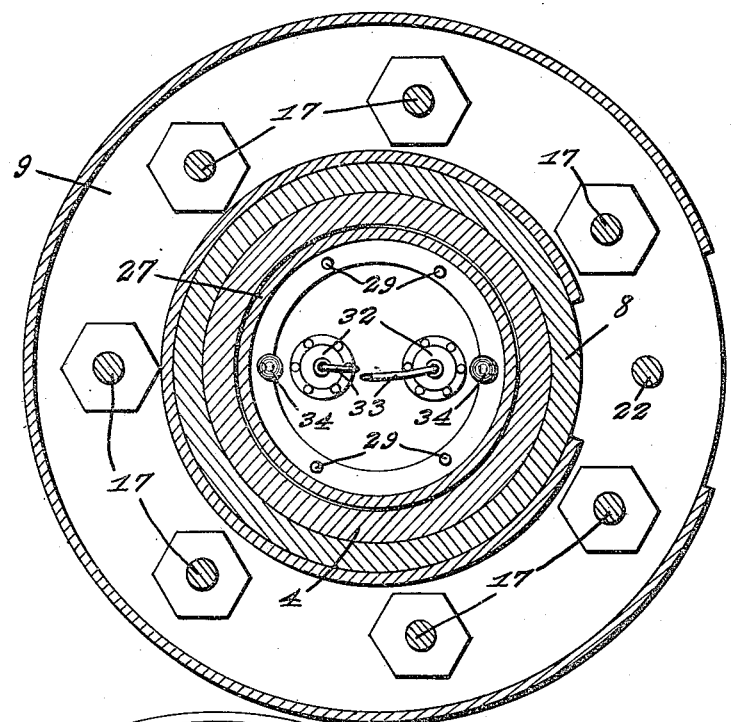
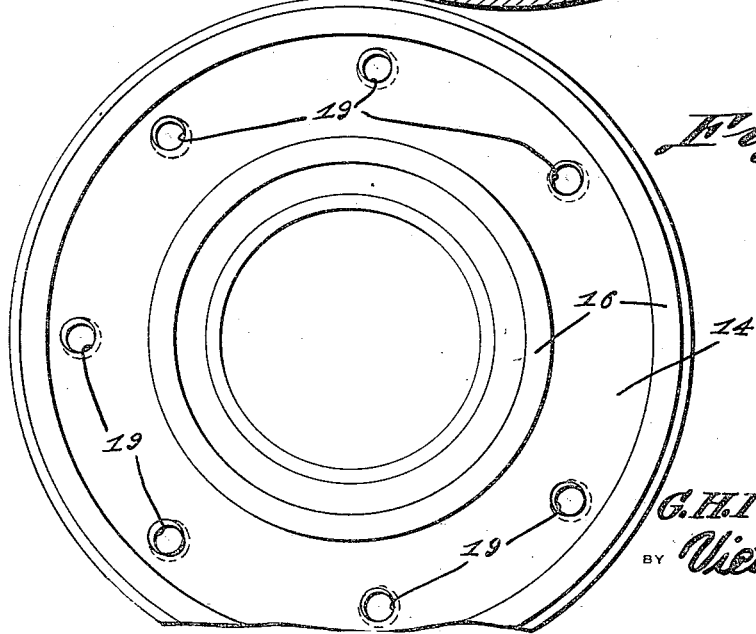

Patented May 24, 1932

1,859,791

UNITED STATES PATENT OFFICE

GEORGE HAMILTON POWERS, OF GLOUCESTER, MASSACHUSETTS

COMMUNICATION CARTRIDGE FOR UNDERSEA VESSELS

Application filed September 22, 1930. Serial No. 483,713.

This invention has as its primary object to provide means whereby those in a submarine which is any distance far below the surface of the body of water in which the submarine is submerged may establish communication with those at the surface of the body of water and be supplied with air and food.

This invention also consists in certain other features of construction and in the combination and arrangement of the several parts, to be hereinafter fully described, illustrated in the accompanying drawings, and specifically pointed out in the appended claim, it being understood that minor changes may be made so long as they fall within the scope of the claim.

In describing my invention in detail, reference will be had to the accompanying drawings, wherein like characters denote like or corresponding parts throughout the several views, and in which:

Figure 1 is a vertical sectional view through the device embodying the invention.

Figure 2 is a horizontal sectional view taken substantially on the line 2—2 of Figure 1, looking in the direction indicated by the arrows.

Figure 3 is a bottom plan view of the closure for the housing of the device.

The device embodying the invention comprises a housing including a bottom section 1 which is preferably of cast metal and of general cylindrical form except, at its top, it is preferably provided with an upstanding cylindrical neck portion 2. This neck portion is exteriorly threaded as indicated by the numeral 3 and there is fitted thereto a cylindrical extension 4 provided with an outstanding flange 5 and interiorly with an annular shoulder 6 between which and the upper end of the extension 2 there is arranged a packing ring 7 so as to render the housing air-tight. A collar 8 is fitted to the member 4 and has an outstanding circumferential flange 9, and this flange is formed at intervals with openings 10 which are interiorly smooth, and with other openings 11 which are threaded. The flange 5 is formed with openings 12 which register at their lower ends with the openings 10 and which are interiorly smooth and with other openings 13 which register at their lower ends with the openings 11 and which are interiorly threaded to correspond with the threads of the openings 11. The member 4 is open at its top except that a removable closure 14 is provided for closing the said open top of the member and this closure may be of metal or any other material found suitable for the purpose and is formed, in its under side with two concentric grooves 15 in which packing gaskets 16 are arranged, these gaskets, in the closed position of the closure 14, engaging the upper surface of the outstanding flange 5 of the member 4. A bolt 17 is rotatably mounted in each of the openings 10 and 12 and has a threaded upper end portion 18 which is threaded in a respective one of a number of threaded openings 19 formed in the closure 14.

A hand wheel 20 is arranged at the lower end of each of the bolts 17 and preferably a packing gland 21 is provided upon the under side of the outstanding flange 5 and surrounds the bolt 17 so as to render the connection fluid-tight. Other bolts indicated in general by the numeral 22 are provided with threaded upper ends 23 and these threaded ends of the bolts are fitted in the threaded openings 11 and 13, which openings are in registration. The remaining portion of the shank of each bolt 22 is cylindrical and smooth and fits in a packing gasket 24 upon the under side of the outstanding flange 5, and a hand wheel 25 is fixed at the lower end of each bolt. It will now be apparent that by tightening all of the bolts 17, the closure 14 will be securely held in closed position upon the top of the housing. However, when these bolts are reversely rotated, through the medium of the hand wheels 20, and out of engagement in the openings 19, the closure 14 will no longer be held by the bolts in place upon the housing. However, as this device is, as before stated, designed for installation in submarines and water pressure might hold the closure in closed position and prevent its uncovering the open upper end of the housing, the bolts 22 will be adjusted for disengagement of the bolts 17 so as to exert pressure against the under side of the closure and thus force the same against the pressure of the water to position uncovering the top of the housing and this closure will, at this time, be no doubt carried away by currents of water.

Interiorly the housing 1 has its neck 2 formed with an annular shoulder 26 and a hollow cylindrical air-tight and bouyant shell 27 is arranged within the neck 2 and the member 4 and is provided with a closing head, at its top, indicated by the numeral 28, which head is held in place by bolts 29. Lenses 30 are mounted in openings in the head 28 and electric light bulbs 31 are arranged within reflectors 32 mounted upon the under side of the head and conductor wires 33 are led through the reflectors and connected electrically with the light bulbs. The shell 27 is closed at its bottom and rests at the periphery of its bottom upon the shoulder 26, and the conductor wires 33 are led through an opening in the bottom of the shell and are coiled within the housing 1 upon the bottom of said housing. This provides for a light signal being given when the closure 14 is displaced and the shell 27 is permitted to rise to the surface of the body of water. In order that an audible signal may also be sounded, the shell 27 is preferably formed of bell members and therefore resonant and hammers or clappers 34 are suspended within the shell beneath the head 28 thereof and will impact the wall of the shell when the shell is tossed about by waves at the surface of the body of water thus causing the bell to ring and give an audible signal.

The invention also contemplates the provision of means whereby those trapped within the submarine may communicate with those at the surface of the water and this means is in the nature of a telephone set 35 which is installed within the shell 27, preferably upon the bottom thereof, and the conductor wires leading from this set are likewise preferably coiled within the housing 1 upon the bottom thereof.

The wires 33 and the conductor wires from the telephone set may be led through a suitable bushing 36 mounted in the bottom of the housing 1. Preferably pipe couplings 37 and 38 are also installed within the bottom of the housing and tubes 39 and 40 are connected to these couplings and have interposed therein cut off valves 41 and 42 respectively, air and food being supplied, respectively, through these tubes, and the couplings 37 and 38 and to other long lengths of tubing 43 which are coiled within the housing 1 and are connected at their other ends to couplings 44 in the bottom of the shell 27, it being understood that air and food may thus be supplied through these tubes and their connections to the occupants of the submerged submarine from a vessel floating on the body of water in which the submarine is submerged.

In order to limit the upward travel of the shell through the water by reason of its buoyancy, and likewise in order to arrest the upward movement of the shell when it reaches the surface of the water, without the likelihood of any severe strain being imposed upon the housing, a cable 45 is connected at one end as at 46 to the bottom of the shell 27 at the center thereof and is led downwardly into the housing and coiled within the same and connected at its lower end as at 47 to the upper end of a tension spring 48, which spring at its lower end is connected as at 49 to an ear upon the bottom of the housing.

What I claim is:

In a device of the class described, a housing formed with superposed intercommunicating compartments, the uppermost compartment opening through one end of the housing and of less size than the other compartment, a shoulder formed between the compartments, a buoyant element releasably fitted within the uppermost compartment and resting upon the shoulder, bell clappers suspended within the buoyant element for sounding an audible signal on vibration of said element when released from the uppermost compartment, visible signalling means associated with said element, anchoring means confined within the lowermost compartment and connected with the buoyant element to limit the buoyant displacement of the latter when released from the uppermost compartment, means for releasably holding the buoyant element in the uppermost compartment, a removable cover for the buoyant element, means within the buoyant element for establishing communication therefrom to a distance determined point, and means for delivering food from within the buoyant element to a distance point.

In testimony whereof I affix my signature.

GEORGE HAMILTON POWERS.